(12) United States Patent
Wang et al.

(10) Patent No.: US 10,234,733 B2
(45) Date of Patent: Mar. 19, 2019

(54) ARRAY SUBSTRATE, DISPLAY DEVICE AND METHOD FOR MANUFACTURING ARRAY SUBSTRATE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhenwei Wang, Beijing (CN); Yuguang Fan, Beijing (CN); Yezhou Fang, Beijing (CN); Hong Zhu, Beijing (CN); Hongjun Yu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 223 days.

(21) Appl. No.: 15/029,209

(22) PCT Filed: Nov. 5, 2015

(86) PCT No.: PCT/CN2015/093849
§ 371 (c)(1),
(2) Date: Apr. 13, 2016

(87) PCT Pub. No.: WO2016/070820
PCT Pub. Date: May 12, 2016

(65) Prior Publication Data
US 2016/0327840 A1  Nov. 10, 2016

(30) Foreign Application Priority Data

Nov. 5, 2014  (CN) .......................... 2014 1 0616456

(51) Int. Cl.
*G02F 1/1343* (2006.01)

(52) U.S. Cl.
CPC .... *G02F 1/134363* (2013.01); *G02F 1/13439* (2013.01); *G02F 1/134309* (2013.01);
(Continued)

(58) Field of Classification Search
CPC ........... G02F 1/13439; G02F 1/134327; G02F 1/134309; G02F 1/134363
See application file for complete search history.

(56) References Cited

U.S. PATENT DOCUMENTS 6,028,653 A * 2/2000 Nishida ............. G02F 1/134363
349/139
6,879,364 B1 * 4/2005 Sasaki ............... G02F 1/133753
349/129
(Continued)

FOREIGN PATENT DOCUMENTS

CN  101055361 A  10/2007
CN  101893774 A  11/2010
(Continued)

OTHER PUBLICATIONS

First Office Action regarding Chinese application No. 201410616456.0, dated Aug. 2, 2016. Translation provided by Dragon Intellectual Property Law Firm.
(Continued)

*Primary Examiner* — James A Dudek
(74) *Attorney, Agent, or Firm* — Harness, Dickey & Pierce, P.L.C.

(57) ABSTRACT

An array substrate, a display device and a method for manufacturing an array substrate are provided. The array substrate includes: two first conductive connection strips arranged opposite to each other; and multiple electrode strips arranged between the two first conductive connection strips. The multiple electrode strips are electrically connected to each other via the two first conductive connection
(Continued)

strips. Slits are formed between adjacent electrode strips. The multiple electrode strips include at least one electrode strip, of which one end is electrically connected to one of the two first conductive connection strips and another end is spaced at a distance from the other of the two first conductive connection strips to form an opening. The opening is communicated with two adjacent slits.

20 Claims, 6 Drawing Sheets

(52) U.S. Cl.
CPC .................. *G02F 1/134327* (2013.01); *G02F 2001/134345* (2013.01); *G02F 2001/134372* (2013.01); *G02F 2201/121* (2013.01); *G02F 2201/123* (2013.01); *G02F 2201/124* (2013.01)

(56) References Cited

U.S. PATENT DOCUMENTS

| | | |
|---|---|---|
| 2007/0052899 A1 | 3/2007 | Lin et al. |
| 2009/0109356 A1 | 4/2009 | Kitagawa |
| 2011/0007260 A1 | 1/2011 | Chien et al. |
| 2011/0176100 A1* | 7/2011 | Nishida ............. G02F 1/134363 349/143 |
| 2012/0182490 A1 | 7/2012 | Kim et al. |
| 2014/0293175 A1* | 10/2014 | Tamaki ............. G02F 1/134363 349/33 |

FOREIGN PATENT DOCUMENTS

| | | |
|---|---|---|
| CN | 202126557 U | 1/2012 |
| CN | 103488002 A | 1/2014 |
| CN | 104317119 A | 1/2015 |
| CN | 204129397 U | 1/2015 |

OTHER PUBLICATIONS

Written Opinion of the International Searching Authority for international application No. PCT/CN2015/093849.
European Search Report regarding Application No. 15848157.2 dated Apr. 20, 2018.

* cited by examiner

ARRAY SUBSTRATE, DISPLAY DEVICE AND METHOD FOR MANUFACTURING ARRAY SUBSTRATE

CROSS REFERENCE TO RELATED APPLICATIONS

This application is a national phase of PCT Application No. PCT/CN2015/093849 filed on Nov. 5, 2015, which claims priority to Chinese patent application No. 201410616456.0, filed with the Chinese State Intellectual Property Office on Nov. 5, 2014, which are is incorporated herein by reference in their entireties.

FIELD

The disclosure relates to the field of display technology, and in particular, to an array substrate, a display device and a method for manufacturing an array substrate.

BACKGROUND

Generally, the liquid crystal display is implemented in two modes, namely a transverse electric field mode and a vertical electric field mode. The liquid crystal displays of the vertical electric field mode have various types such as a fringe field switching (FFS) mode, an in-plane switching (IPS) mode, an advanced super dimension switching (ADS) mode and the like.

In the liquid crystal display device of the vertical electric field mode, in a case that a sub-pixel has a highest brightness, corresponding liquid crystal molecules are in a maximum deflection state. Here, if a display screen of the display device is subjected to an external pressure (for example, a user applies a pressure on a screen when performing a touch control operation), liquid crystal molecules may be deflected in reverse.

In the case that the liquid crystal molecules are deflected in reverse, it is difficult to restore or quickly restore the liquid crystal molecules to the maximum deflection state in a horizontal direction due to restoring forces acted on the liquid crystal molecules; therefore, an actual brightness of the display is lower than a target brightness, and display quality is adversely affected.

SUMMARY

An array substrate, a display device and a method for manufacturing an array substrate are provided according to embodiments of the disclosure, to improve display quality.

An array substrate is provided according to an embodiment of the disclosure, which includes: a pixel electrode arranged corresponding to a sub-pixel, a common electrode arranged corresponding to the sub-pixel, and an insulating layer arranged between the pixel electrode and the common electrode. A transverse electric field applied to liquid crystal molecules is generated by the pixel electrode and the common electrode. At least one of the pixel electrode and the common electrode includes: two first conductive connection strips arranged opposite to each other; and multiple electrode strips arranged between the two first conductive connection strips. The multiple electrode strips are electrically connected to each other via the two first conductive connection strips, and slits are formed between adjacent electrode strips. The multiple electrode strips include at least one electrode strip, of which one end is electrically connected to one of the two first conductive connection strips and another end is spaced at a distance from the other of the two first conductive connection strips to form an opening. The opening is communicated with two adjacent slits.

Optionally, the above-described array substrate further includes: two second conductive connection strips arranged opposite to each other, where a conductive connection frame is formed by the two second conductive connection strips and the two first conductive connection strips, and the multiple electrode strips are electrically connected to each other via the conductive connection frame.

Optionally, in the above-described array substrate, the multiple electrode strips include an auxiliary electrode strip, and two ends of the auxiliary electrode strip are respectively electrically connected to the two first conductive connection strips arranged opposite to each other.

Optionally, the above-described array substrate further includes one second conductive connection strip. A conductive connection structure is formed by the second conductive connection strip and the two first conductive connection strips arranged opposite to each other, and the multiple electrode strips are electrically connected to each other via the conductive connection structure.

Optionally, in the above-described array substrate, the multiple electrode strips are parallel to each other.

Optionally, in the above-described array substrate, in a case that multiple openings are formed between the at least one electrode strip and the two first conductive connection strips, a part of the multiple openings are formed at a side of one of the two first conductive connection strips, and the other part of the multiple openings are formed at a side of the other of the two first conductive connection strips.

Optionally, the above-described array substrate is an array substrate of a fringe field switching (FFS) mode, an array substrate of an in-plane switching (IPS) mode or an array substrate of an advanced super dimension switching (ADS) mode.

Optionally, in the above-described array substrate, the conductive connection frame and the multiple electrode strips are formed by means of on patterning process.

Optionally, in the above-described array substrate, the multiple electrode strips are arranged perpendicular to one of the two first conductive connection strips arranged opposite to each other.

Optionally, in the above-described array substrate, the multiple electrode strips are arranged obliquely relative to one of the two first conductive connection strips arranged opposite to each other.

Optionally, in the above-described array substrate, the two first conductive connection strips arranged opposite to each other are parallel.

Optionally, in the above-described array substrate, one of the multiple electrode strips has a V-shaped structure.

A display device is provided according to an embodiment of the disclosure, which includes the above-described array substrate.

A method for manufacturing an array substrate is provided according to an embodiment of the disclosure, which includes: forming a pixel electrode and/or a common electrode by using a mask plate, where the formed pixel electrode and/or common electrode includes: two first conductive connection strips arranged opposite to each other; and multiple electrode strips arranged between the two first conductive connection strips, where the multiple electrode strips are electrically connected to each other via the two first conductive connection strips, slits are formed between adjacent electrode strips. The multiple electrode strips include at least one electrode strip, of which one end is electrically connected to one of the two first conductive connection strips and another end is spaced at a distance from the other of the two first conductive connection strips to form an opening, and the opening is communicated with two adjacent slits.

Optionally, in the above-described array substrate, in a case that multiple openings are formed between the at least one electrode strip and the two first conductive connection strips, a part of the multiple openings are formed at a side of one of the two first conductive connection strips, and the other part of the multiple openings are formed at a side of the other of the two first conductive connection strips.

According to the embodiments of the disclosure, one end of at least one electrode strip is electrically connected to one of the two first conductive connection strips, another end of the at least one electrode strip is spaced at a distance from the other of the two first conductive connection strips to form an opening, and the opening is communicated with the slits. With the electrode strips arranged in the above-described way, the direction of the electric field at the opening is different from the direction of the electric field at other locations within the sub-pixel, and thus the liquid crystal molecules at the opening are deflected slightly and the liquid crystal molecules at other locations in the sub-pixel are restored quickly under the effect of the slightly deflected liquid crystal molecules, thereby improving display effect.

DETAILED DESCRIPTION OF THE EMBODIMENTS

According to embodiments of the present disclosure, the electrode strips are designed to change states of liquid crystal molecules at edges of sub-pixels, and the liquid crystal molecules at the edges of the sub-pixels have a viscous effect on other liquid crystal molecules in the sub-pixels, so as to quickly restore the other liquid crystal molecules to original deflection states and improve display effect.

Figure 1A:
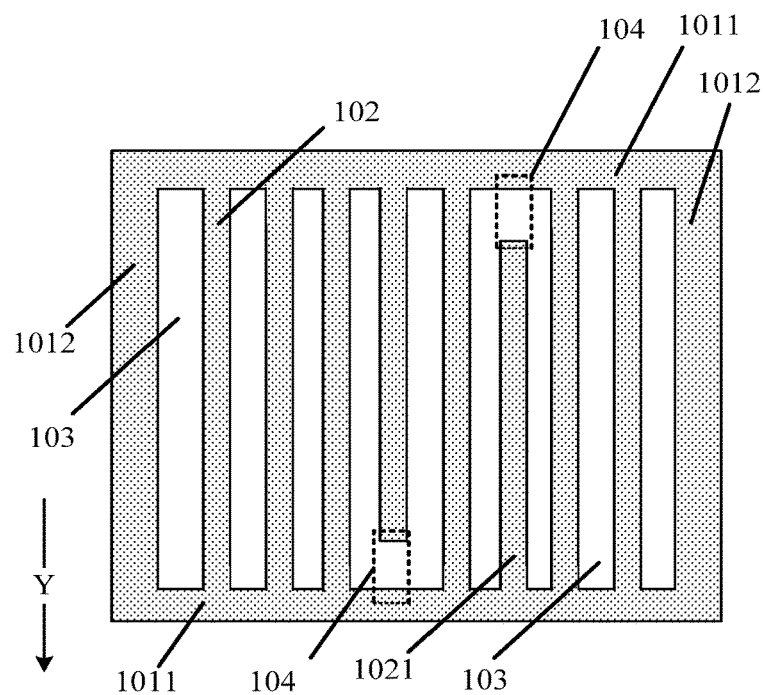
FIG. 1a is a schematic structural diagram of at least one of a pixel electrode and a common electrode in an array substrate according to an embodiment of the present disclosure.

An array substrate is provided according to an embodiment of the disclosure, which includes: a pixel electrode arranged corresponding to a sub-pixel and a common electrode arranged corresponding to the sub-pixel, and an insulating layer arranged between the pixel electrode and the common electrode. A transverse electric field applied to liquid crystal molecules is caused by the pixel electrode and the common electrode. As shown in FIG. 1a, at least one of the pixel electrode and the common electrode includes: two first conductive connection strips 1011 arranged opposite to each other and multiple electrode strips 102 arranged between the two first conductive connection strips 1011. The multiple electrode strips 102 and the two first conductive connection strips 1011 are electrically connected as a whole. Slits 103 are formed between adjacent electrode strips. The electrode strips 102 include at least one electrode strip 1021, of which one end is electrically connected to one of the two first conductive connection strips 1011 and another end is spaced at a distance from the other of the two first conductive connection strips 1011 to form an opening 104. The opening 104 is communicated with two adjacent slits 103.

As shown in FIG. 1a, the array substrate according to the embodiment of the disclosure further includes two second conductive connection strips 1012 arranged opposite to each other. A conductive connection frame is formed by the two second conductive connection strips 1012 and the two first conductive connection strips 1011, and the multiple electrode strips 102 are electrically connected via the conductive connection frame.

Figure 1B:
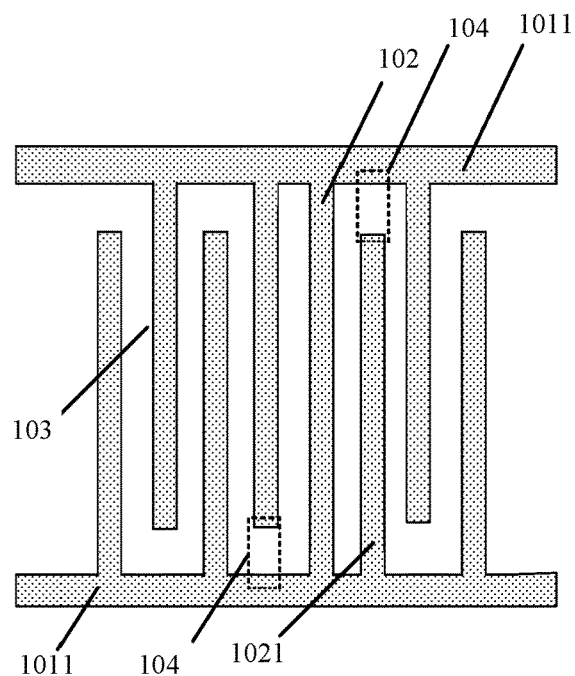
FIG. 1b is a schematic structural diagram of at least one of a pixel electrode and a common electrode in an array substrate according to an embodiment of the present disclosure.

As shown in FIG. 1a, the conductive connection frame is formed, but embodiments of the disclosure are not limited to the structure of the conductive connection frame. FIG. 1b is another schematic structural diagram of at least one of a pixel electrode and a common electrode in an array substrate according to an embodiment of the present disclosure. Compared with the structure shown in FIG. 1a, no second conductive connection strip 1012 is arranged. The multiple electrode strips include an auxiliary electrode strip, of which two ends are respectively electrically connected to the two first conductive connection strips 1011 arranged opposite to each other, and consequently, the multiple electrode strips 102 and the two first conductive connection strips 1011 are electrically connected as a whole.

Figure 1C:
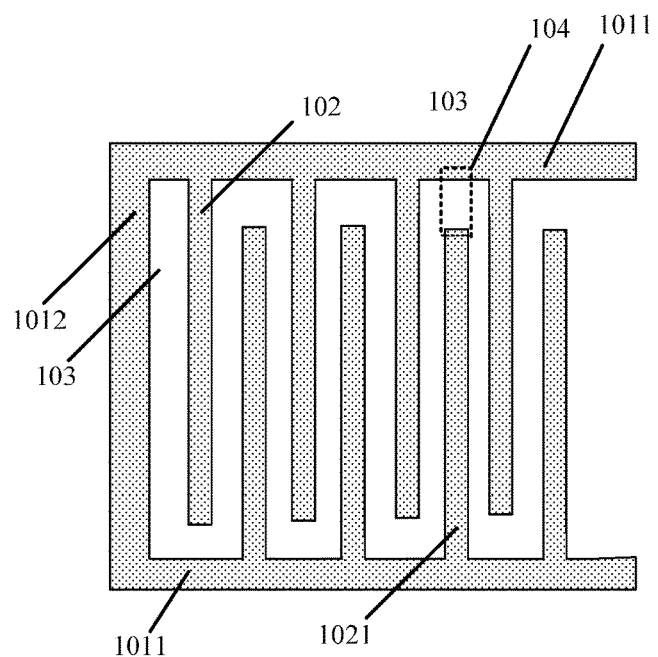
FIG. 1c is a schematic structural diagram of at least one of a pixel electrode and a common electrode in an array substrate according to an embodiment of the present disclosure.

FIG. 1c is further another schematic structural diagram of at least one of pixel electrodes and common electrodes in an array substrate according to an embodiment of the present disclosure. Only one second conductive connection strip 1012 is provided. Any one of the multiple electrode strips is electrically connected to only one of the two first conductive connection strips 1011. All the electrode strips are electrically connected as a whole via the first conductive connection strips 1011 to which corresponding electrode strips are electrically connected and the second conductive connection strip 1012.

Although various ways for implementing opening structures according to the embodiments of the disclosure are listed above, the embodiments of the disclosure are not limited to the above-described ways, as long as an opening structure is formed between the electrode strips and the conductive connection strips while any formed pixel electrode or any formed common electrode is integrally electrically connected.

Figure 2:
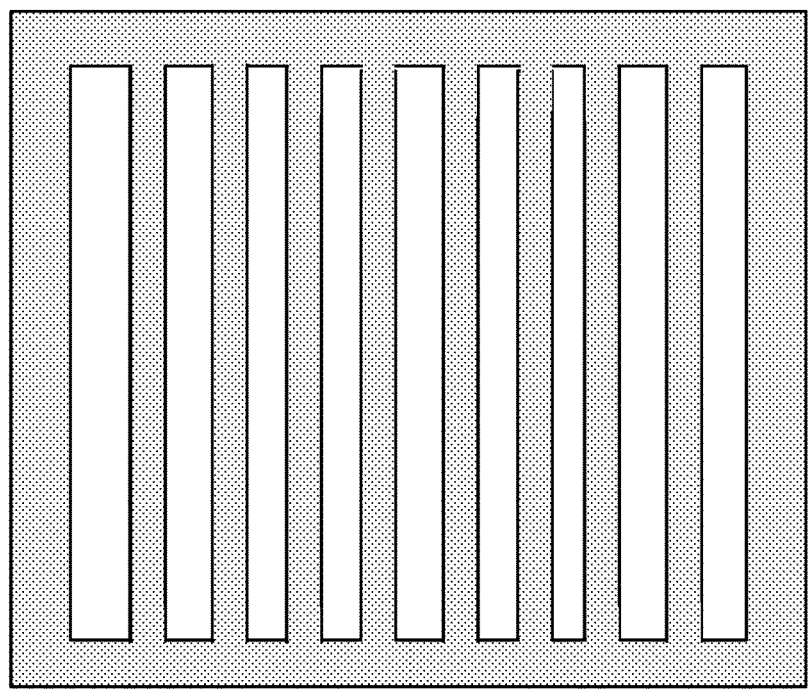
FIG. 2 is a schematic structural diagram of pixel electrodes and common electrodes in an array substrate in related technology.

Compared with pixel electrodes or common electrodes in related technology as shown in FIG. 2, in the structures as shown in FIG. 1*a*, FIG. 1*b* and FIG. 1*c* according to the embodiments of the present disclosure, the electrode strips include at least one electrode strip, of which one end is electrically connected to one first conductive connection strip 1011 and another end is spaced at a distance from the other first conductive connection strip 1011 to form an opening, and the opening is communicated with the slits. With the electrode strips arranged in the above-described way, the direction of the electric field at the opening is different from the direction of the electric field at other locations in the sub-pixel. The liquid crystal molecules at the opening are deflected slightly, and the liquid crystal molecules at other locations in the sub-pixel are restored quickly under the effect of the slightly deflected liquid crystal molecules, thereby improving display effect.

The fact that the display effect of the array substrate according to the embodiments of the present disclosure can be improved is explained in detail below.

As shown in FIG. 2, in pixel electrodes or common electrodes with slits in the related technology, two ends of each electrode strip are respectively connected to two opposite sides of the conductive connection frame. Therefore, the electric field caused by the whole electrode strip and another plate electrode is uniform at different locations at the electrode strip.

In the embodiments of the disclosure, as shown in FIG. 1*a*-FIG. 1*c*, one end of the electrode strip 1021 is spaced at a distance from the first conductive connection strip to form an opening 104, no electrode strip exists at the opening 104. Hence, directions and intensities of the electric field at the opening and the electric field at the location of the electrode strip 1021 change. The changed electric fields can quickly restore the liquid crystal molecules, which is interpreted as follows.

Figure 3A:
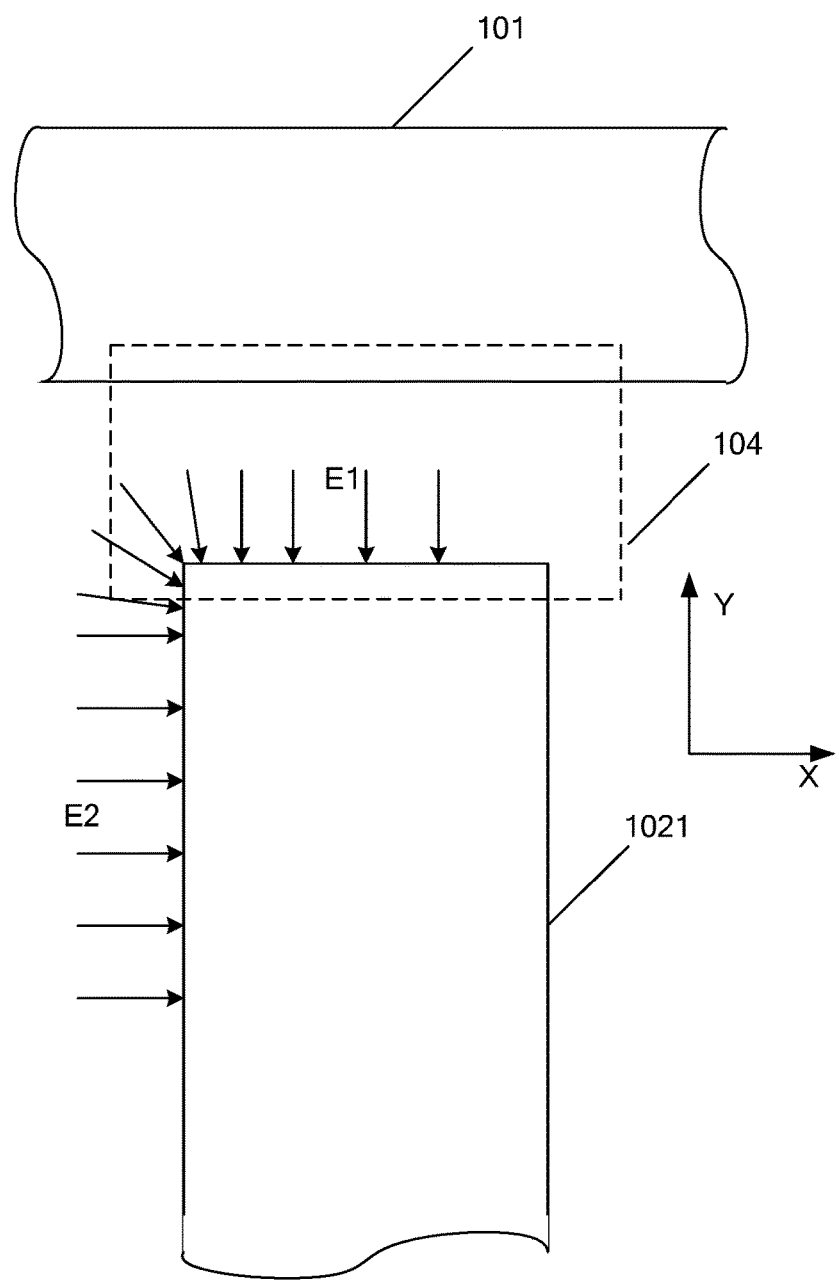
FIG. 3a is a schematic diagram of an electric field caused by one electrode strip with an opening in the array substrate as shown in FIG. 1a-FIG. 1c according to an embodiment of the present disclosure.

Compared with the array substrate in the related technology as shown in FIG. 2, in a case that the sub-pixel has a highest grey scale, as shown in FIG. 3*a*, the electrode strip 1021 generates a planar electric field E1 at the opening 104 due to electric signals respectively applied to the pixel electrode and the common electrode. As shown in FIG. 3*a*, the direction of E1 is perpendicular to a short side of the electrode strip 1021, and E1 may generate forces causing the liquid crystal molecules to deflect to a Y-direction. As shown in FIG. 3*a*, a planar electric field E2 is generated at other positions of the electrode strip 1021 due to the electric signals respectively applied to the pixel electrode and the common electrode. As shown in FIG. 3*a*, the direction of E2 is perpendicular to a long side of the electrode strip 1021, and E2 may generate forces causing the liquid crystal molecules to deflect to an X-direction. The X-direction and the Y-direction are shown in FIG. 3*a*, the X-direction is perpendicular to the long side of the electrode strip 1021, and the Y-direction is perpendicular to the short side of the electrode strip 1021.

Figure 3B:
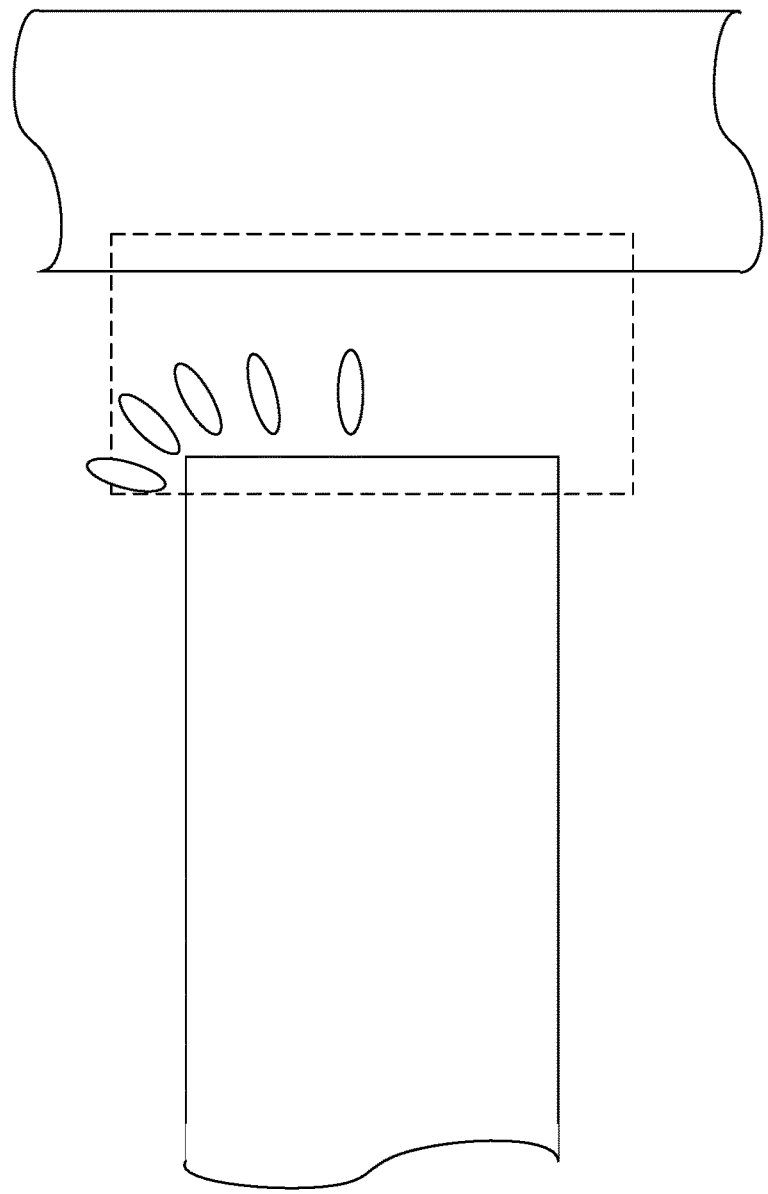
FIG. 3b schematically shows the deflection of liquid crystal molecules at the opening under the effect of the electric field as shown in FIG. 3a according to an embodiment of the present disclosure.

As shown in FIG. 3*b*, under the above-described electric fields E1 and E2, the liquid crystal molecules at the center of the opening are substantially in an undeflected state since the electric field E2 has less effect on the liquid crystal molecules at the center of the opening. The liquid crystal molecules closer to an edge of the opening are deflected more greatly since the electric field E2 has more effect on the liquid crystal molecules closer to the edge of the opening. However, even the liquid crystal molecules closest to the edge of the opening cannot be in a maximum deflection state due to the effect of E1, that is, even the liquid crystal molecules closest to the edge of the opening cannot be deflected due to the effect of E2 such that the direction of long axises of the liquid crystal molecules is identical to the X-direction.

Figure 5:
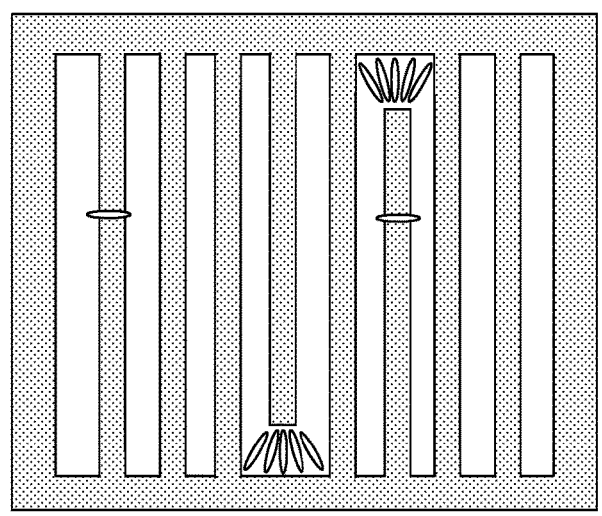
FIG. 5 schematically shows the deflection of liquid crystal molecules at different locations within a sub-pixel having a highest grey scale in an array substrate according to an embodiment of the present disclosure.

That is to say, under the above-described electric fields E1 and E2, in a case that the sub-pixel has the highest grey scale, the liquid crystal molecules at the region of the opening 104 may be maintained in a slight deflection state as shown in FIG. 5, and the liquid crystal molecules at other locations may be maintained in the maximum deflection state (i.e., the direction of long axis of the liquid crystal molecules is parallel to the X-direction) as shown in FIG. 5.

That is to say, due to the existence of the above-described electric fields E1 and E2, in a case that the sub-pixel has the highest grey scale, as shown in FIG. 5, the liquid crystal molecules at the opening is less deflected than the liquid crystal molecules at other locations in the sub-pixel, and the liquid crystal molecules at the opening are not in the horizontal maximum deflection state.

In a case that the sub-pixel is pressed, there is a gap between the deflection state of the liquid crystal molecules at the opening and the horizontal maximum deflection state, and therefore, the liquid crystal molecules at the opening may not be deflected in reverse. In a case that the sub-pixel is not pressed, since the liquid crystal molecules at the opening are not deflected in reverse, the liquid crystal molecules at the opening can be quickly restored to original locations, and the liquid crystal molecules at other locations may be quickly restored to the horizontal deflection state due to viscous forces between the liquid crystal molecules at the other locations and the liquid crystal molecules at the opening.

Figure 4A:
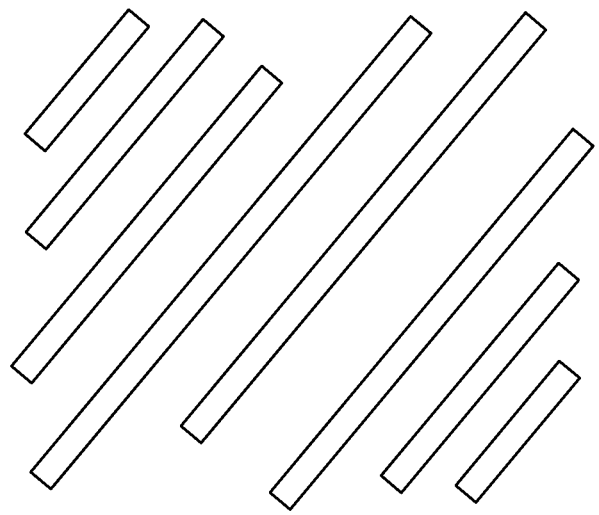
FIG. 4a-4b schematically show shapes and locations of electrode strips according to embodiments of the present disclosure.
Figure 4B:
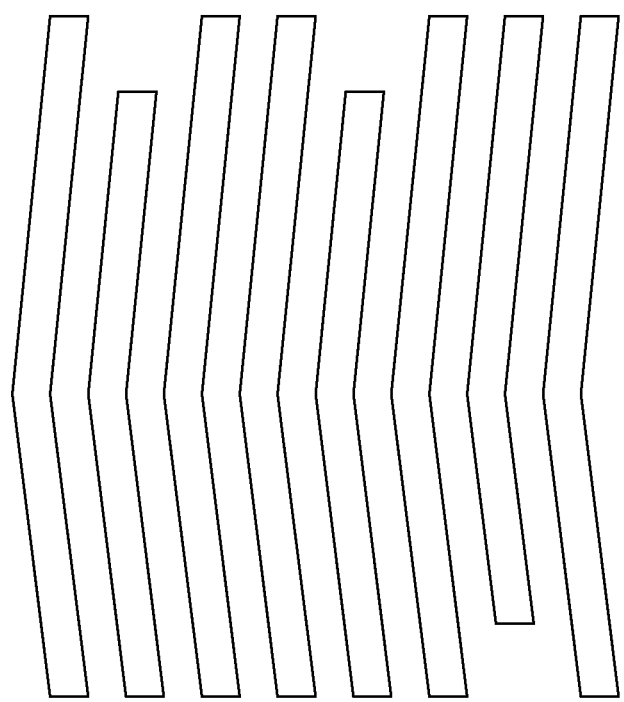

In an embodiment of the disclosure, as shown in FIG. 4*a*, the multiple electrode strips are parallel to each other and arranged obliquely relative to one of the two first conductive connection strips arranged opposite to each other. In an embodiment of the disclosure, as shown in FIG. 1*a*-FIG. 1*c*, the multiple electrode strips are parallel to each other, the two first conductive connection strips are parallel to each other, and the multiple electrode strips are arranged perpendicular to the two first conductive connection strips. In an embodiment of the disclosure, as shown in FIG. 4*b*, the multiple electrode strips are parallel to each other and each of the multiple electrode strips has a V-shaped structure. Of course, in other embodiments of the disclosure, the multiple electrode strips may not be parallel to each other; or one of the multiple electrode strips has a V-shaped structure while other electrode strips have other shapes, the shapes of the respective electrode strips may be designed as needed as long as the shapes of the multiple electrode strips are integrally matched. Whether the two first conductive connection strips are parallel to each other or not, whether the multiple electrode strips are parallel to each other or not, and shapes of the respective electrode strips are not limited in the disclosure.

In the above-described array substrate, the first conductive connection strips, the second conductive connection strips and the multiple electrode strips can be formed through one patterning process.

One opening may be provided or multiple openings may be provided. In a case that multiple openings are provided, the reversely deflected liquid crystal molecules are affected in various directions, and thus the liquid crystal molecules are quickly restored to the horizontal deflection state. In the embodiments of the disclosure, as shown in FIG. 1*a*-FIG. 1*c*, a part of the multiple openings are formed at a side of one of the two first conductive connection strips, and the other part of the multiple openings are formed at a side of the other of the two first conductive connection strips. In an embodiment of the disclosure, among the electrode strips forming openings with the two first conductive connection strips, there is one and only one opening between each of the electrode strips and the two first conductive connection strips.

Moreover, the number, location and size of the opening may be obtained by simulation or actual measurement, which are not described in detail.

Based on the above-described arrangement, as shown in FIG. 1a-FIG. 1c, the liquid crystal molecules at the opening at an upper portion may downwardly affect the reversely deflected liquid crystal molecules at other locations in the sub-pixel, to be restored to the horizontal deflection state, and the liquid crystal molecules at the opening at a lower portion may upwardly affect the reversely deflected liquid crystal molecules at other locations in the sub-pixel, to be restored to the horizontal deflection state. Compared with a way of affecting in one direction the liquid crystal molecules at other locations in the sub-pixel to restore, the liquid crystal molecules in the sub-pixel may be more quickly restored by arranging multiple openings at a side of each of the two first conductive connection strips.

The array substrate according to the embodiments of the disclosure may be an array substrate of an FFS mode, an array substrate of an IPS mode or an array substrate of an ADS mode.

In order to achieve the above objects, a display device is provided according to an embodiment of the disclosure, which includes the above-described array substrate.

A manufacturing process for an array substrate according to an embodiment of the present disclosure is described based on an example that the array substrate is an ADS array substrate in which pixel electrodes are located above the common electrodes. The manufacturing process includes the following steps 1-6.

In step 1, gate electrodes and gate lines are formed.

This step may be implemented by means of any kind of one patterning process. The patterning process includes processes for forming a pattern, such as exposing, developing and etching. The one patterning process is a patterning process in which one mask plate is used. For example, by means of an ordinary masking process, a gate metal film on a glass substrate is patterned by using an ordinary mask plate, to form a pattern including gate electrodes and gate lines. Specifically, the gate metal film is deposited on the substrate, and then the gate metal film is exposed, developed and etched by using the ordinary mask plate to obtain the pattern including the gate electrodes and the gate lines.

The ordinary mask plate is a typically used mask plate having a light transmitting region and a light non-transmitting region. After a photoresist layer formed on the gate metal film is exposed and developed by using the ordinary mask plate, a part of the gate metal film which is needed to be reserved is covered by photoresist, and photoresist on a part of the gate metal film which is not needed to be reserved is removed, the part of the gate metal film which is not needed is etched off by means of an etching process, and the remaining gate metal film is the patterned gate electrodes.

The gate metal film may be formed by a sputtering process, or may be formed by other processes well known to those skilled in the art.

In step 2, a gate insulating layer is formed on the substrate processed by step 1.

The gate insulating layer may be formed by a chemical vapor deposition process, or may be formed by other processes well known to those skilled in the art.

In step 3, an active layer, source electrodes and drain electrodes are formed.

Step 3 may be implemented by using a multi-tone mask plate, or by using a double-tone mask plate in conjunction with a plasma ashing process. The specific implementation process includes: first, forming a semiconductor film for producing the active layer and a metal film for producing the source electrodes and the drain electrodes successively on the gate insulating layer; then, etching off the semiconductor film and the metal film at regions other than preset regions where thin film transistors are to be formed; and finally, etching the reserved metal film to form the source electrodes and the drain electrodes.

In step 4, common electrodes are formed.

The process of forming the common electrodes is similar to the above-described process, which is not described in detail.

In step 5, via holes for pixel electrodes are formed.

First, a passivation layer is formed. The passivation layer may be formed by a chemical vapor deposition process, or may be formed by other processes well known to those skilled in the art.

Then, the passivation layer is coated by photoresist, and is exposed and developed by using a double-tone mask plate, photoresist at a region where via holes for pixel electrodes are to be formed is removed to form the via holes for pixel electrodes.

In step 6, pixel electrodes are formed.

A process of forming pixel electrodes includes: forming an indium tin oxide (ITO) film on the passivation layer and in the via holes for pixel electrodes; and patterning the ITO film by using a mask plate to form a pattern of a pixel electrode film.

It should be noted that, among the electrode strips included in the pixel electrode according to the embodiments of the disclosure as shown in FIG. 1a-FIG. 1c, one end of a part of or all of the electrode strips is electrically connected to one of the two first conductive connection strips 1011, and another end of the part of or all of the electrode strips is spaced at a distance from the other of the two first conductive connection strips 1011 to form an opening.

In the manufacturing process of the array substrate according to the embodiment of the disclosure, the shape of the mask plate used in patterning the ITO film is different from the shape of the ordinary mask plate.

The pixel electrode film may be formed by a sputtering process, or may be formed by other processes well known to those skilled in the art.

After a photoresist layer formed on the ITO film is exposed and developed by using the mask plate, a part of the pixel electrode film which is needed to be reserved is covered by photoresist, and photoresist on a part of the pixel electrode film which is not needed to be reserved is removed, a part of the ITO film which is not needed is etched off by means of an etching process, and the remaining pixel electrode film is the pixel electrodes.

Of course, it should be understood that, the above description of the embodiments of the disclosure is merely illustrative, and the embodiments of the disclosure are not limited to the above-described array substrate and the manufacturing process thereof. It is apparent to those skilled in the art that various changes and modifications may be made to the disclosure without departing from the spirit and scope of the disclosure. In this way, provided that these changes and modifications of the disclosure belong to the scope of the claims and equivalent techniques of the disclosure, the disclosure also intends to include these changes and modifications.

What is claimed is:

1. An array substrate, comprising: a pixel electrode arranged corresponding to a sub-pixel, a common electrode arranged corresponding to the sub-pixel, and an insulating layer arranged between the pixel electrode and the common electrode, wherein a transverse electric field applied to liquid crystal molecules is generated by the pixel electrode and the common electrode, and at least one of the pixel electrode and the common electrode comprises:

two first conductive connection strips arranged opposite to each other; and a plurality of electrode strips arranged between the two first conductive connection strips wherein:

the plurality of electrode strips is electrically connected to each other via the two first conductive connection strips, and slits are formed between adjacent electrode strips, the plurality of electrode strips comprises at least a first electrode strip and a second electrode strip, a first end of the first electrode strip is electrically connected to a first one of the two first conductive connection strips, a second end of the first electrode strip is spaced at a first distance from a second one of the two first conductive connection strips to form a first opening between the second end of the first electrode strip and the second one of the two first conductive connection strips, second ends of two adjacent slits at both sides of the first electrode strip are communicated by the first opening, a second end of the second electrode strip is electrically connected to the second one of the two first conductive connection strips, a first end of the second electrode strip is spaced at a second distance from the first one of the two first conductive connection strips to form a second opening between the first end of the second electrode strip and the first one of the two first conductive connection strips, first ends of two adjacent slits at both sides of the second electrode strip are communicated by the second opening, the plurality of electrode strips comprises at least one auxiliary electrode strip, and two ends of the at least one auxiliary electrode strip are respectively electrically connected to the two first conductive connection strips arranged opposite to each other, the two first conductive connection strips are: (i) equal in length, and (ii) arranged in a horizontal direction, and the two first conductive connection strips extend over the plurality of electrode strips.

2. The array substrate according to claim 1, further comprising: two second conductive connection strips arranged opposite to each other, wherein a conductive connection frame is formed by the two second conductive connection strips and the two first conductive connection strips, and the plurality of electrode strips is electrically connected to each other via the conductive connection frame.

3. The array substrate according to claim 1, further comprising one second conductive connection strip, wherein a conductive connection structure is formed by the second conductive connection strip and the two first conductive connection strips arranged opposite to each other, and the plurality of electrode strips is electrically connected to each other via the conductive connection structure.

4. The array substrate according to claim 1, wherein the plurality of electrode strips is parallel to each other.

5. The array substrate according to claim 1, wherein in a case that a plurality of openings is formed between the plurality of electrode strips and the two first conductive connection strips, a part of the plurality of openings are formed at a side of the first one of the two first conductive connection strips, and the other part of the plurality of openings are formed at a side of the second one of the two first conductive connection strips.

6. The array substrate according to claim 1, wherein the array substrate is an array substrate of a fringe field switching (FFS) mode, an array substrate of an in-plane switching (IPS) mode or an array substrate of an advanced super dimension switching (ADS) mode.

7. The array substrate according to claim 2, wherein the conductive connection frame and the plurality of electrode strips are formed by means of one patterning process.

8. The array substrate according to claim 1, wherein the plurality of electrode strips is arranged perpendicular to one of the two first conductive connection strips arranged opposite to each other.

9. The array substrate according to claim 1, wherein the plurality of electrode strips is arranged obliquely relative to one of the two first conductive connection strips arranged opposite to each other.

10. The array substrate according to claim 1, wherein the two first conductive connection strips arranged opposite to each other are parallel.

11. The array substrate according to claim 1, wherein one of the plurality of electrode strips has a V-shaped structure.

12. A display device, comprising an array substrate, wherein the array substrate comprises: a pixel electrode arranged corresponding to a sub-pixel, a common electrode arranged corresponding to the sub-pixel, and an insulating layer arranged between the pixel electrode and the common electrode, wherein a transverse electric field applied to liquid crystal molecules is generated by the pixel electrode and the common electrode, and at least one of the pixel electrode and the common electrode comprises:

two first conductive connection strips arranged opposite to each other; and a plurality of electrode strips arranged between the two first conductive connection strips wherein:

the plurality of electrode strips is electrically connected to each other via the two first conductive connection strips, and slits are formed between adjacent electrode strips, the plurality of electrode strips comprises at least a first electrode strip and a second electrode strip, a first end of the first electrode strip is electrically connected to a first one of the two first conductive connection strips, a second end of the first electrode strip is spaced at a first distance from a second one of the two first conductive connection strips to form a first opening between the second end of the first electrode, strip and the second one of the two first conductive connection strips, second ends of two adjacent slits at both sides of the first electrode strip are communicated by the first opening, a second end of the second electrode strip is electrically connected to the second one of the two first conductive connection strips, a first end of the second electrode strip is spaced at a second distance from the first one of the two first conductive connection strips to form a second opening between the first end of the second electrode strip and the first one of the two first conductive connection strips, first ends of two adjacent slits at both sides of the second electrode strip are communicated by the second opening, the plurality of electrode strips comprises at least one auxiliary electrode strip, and two ends of the at least one auxiliary electrode strip are respectively electrically connected to the two first conductive connection strips arranged opposite to each other, the two first conductive connection strips are: (i) equal in length, and (ii) arranged in a horizontal direction, and the two first conductive connection strips extend over the plurality of electrode strips.

13. A method for manufacturing an array substrate, comprising: forming a pixel electrode and/or a common electrode by using a mask plate, wherein the formed pixel electrode and/or common electrode comprises:

two first conductive connection strips arranged opposite to each other; and a plurality of electrode strips arranged between the two first conductive connection strips wherein:

the plurality of electrode strips is electrically connected to each other via the two first conductive connection strips, and slits are formed between adjacent electrode strips, the plurality of electrode strips comprises at least a first electrode strip and a second electrode strip, a first end of the first electrode strip is electrically connected to a first one of the two first conductive connection strips, a second end of the first electrode strip is spaced at a first distance from a second one of the two first conductive connection strips to form a first opening between the second end of the first electrode strip and the second one of the two first conductive connection strips, second ends of two adjacent slits at both sides of the first electrode strip are communicated by the first opening, a second end of the second electrode strip is electrically, connected to the second one of the two first conductive connection strips, a first end of the second electrode strip is spaced at a second distance from the first one of the two first conductive connection strips to forma second opening between the first end of the second electrode strip and the first one of the two first conductive connection strips, first ends of two adjacent slits at both sides of the second electrode strip are communicated by the second opening, the plurality of electrode strips comprises at least one auxiliary electrode strip, and two ends of the at least one auxiliary electrode strip are respectively electrically connected to the two first conductive connection strips arranged opposite to each other, the two first conductive connection strips are: (i) equal in length, and (ii) arranged in a horizontal direction, and the two first conductive connection strips extend over the plurality of electrode strips.

14. The method for manufacturing the array substrate according to claim 13, wherein in a case that a plurality of openings is formed between the plurality of electrode strips and the two first conductive connection strips, a part of the plurality of openings are formed at a side of the first one of the two first conductive connection strips, and the other part of the plurality of openings are formed at a side of the second one of the two first conductive connection strips.

15. The display device according to claim 12, wherein the array substrate further comprises: two second conductive connection strips arranged opposite to each other, wherein a conductive connection frame is formed by the two second conductive connection strips and the two first conductive connection strips, and the plurality of electrode strips is electrically connected to each other via the conductive connection frame.

16. The display device according to claim 12, wherein the array substrate further comprises one second conductive connection strip, wherein a conductive connection structure is formed by the second conductive connection strip and the two first conductive connection strips arranged opposite to each other, and the plurality of electrode strips is electrically connected to each other via the conductive connection structure.

17. The display device according to claim 12, wherein the plurality of electrode strips is parallel to each other.

18. The display device according to claim 12, wherein in a case that a plurality of openings is formed between the plurality of electrode strips and the two first conductive connection strips, a part of the plurality of openings are formed at a side of the first one of the two first conductive connection strips, and the other part of the plurality of openings are formed at a side of the second one of the two first conductive connection strips.

19. The array substrate according to claim 1, wherein the first electrode strip and the second electrode strip are adjacent by forming a slit between the first electrode strip and the second electrode strip.

20. The array substrate according to claim 1, wherein:
the at least one auxiliary electrode strip is between the first electrode strip and the second electrode strip;
a first slit is formed between the at least one auxiliary electrode strip and the first electrode strip; and
a second slit is formed between the at least one auxiliary electrode strip and the second electrode strip.

* * * * *